United States Patent
Schramm et al.

(10) Patent No.: US 6,553,540 B1
(45) Date of Patent: Apr. 22, 2003

(54) EFFICIENT SYSTEM AND METHOD FOR FORWARD ERROR CORRECTION

(75) Inventors: Peter Schramm, Erlangen (DE); Udo Wachsmann, Schwabach (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/397,512

(22) Filed: Sep. 17, 1999

Related U.S. Application Data

(60) Provisional application No. 60/120,867, filed on Feb. 19, 1999, and provisional application No. 60/111,153, filed on Dec. 7, 1998.

(51) Int. Cl.$^7$ .............................................. H03M 13/03
(52) U.S. Cl. ...................................................... 714/790
(58) Field of Search ................................ 375/340–341, 375/225, 265, 349, 346, 262; 714/758, 796, 786, 759, 756, 701, 790, 788; 370/342, 335; 455/226.3, 67.3

(56) References Cited

U.S. PATENT DOCUMENTS

| | | | |
|---|---|---|---|
| 4,908,827 A | * 3/1990 | Gates | 714/790 |
| 5,197,061 A | 3/1993 | Halbert-Lassalle et al. | 370/204 |
| 5,416,787 A | * 5/1995 | Kodama et al. | 714/774 |
| 5,903,554 A | * 5/1999 | Saints | |
| 6,061,387 A | * 5/2000 | Yi | 375/142 |
| 6,141,388 A | * 10/2000 | Servais et al. | |
| 6,202,189 B1 | * 3/2001 | Hinedi et al. | 714/786 |
| 6,289,486 B1 | * 9/2001 | Lee et al. | 714/788 |
| 6,332,209 B1 | * 12/2001 | Eroz et al. | 714/790 |
| 6,339,834 B1 | * 1/2002 | Crozier et al. | 714/701 |

OTHER PUBLICATIONS

Wang et al., ( To bite or not to bite–a study of tail bits versus tail–biting; IEEE; on pp. 317–321 vol. 2; 15–18 Oct. 15–18, 1996).*

Woerz et al. (Multistage coding and decoding for a M–PSK system; IEEE; on pp. 698–703 vol. 2 ; Dec. 2–5, 1990).*

Michelson et al. (Bit–error rate performance of the (63,57) Hamming code and a severely punctured convolution code with maximum likelihood decoding; IEEE; on pp. 1012–1016 vol. 3; Oct. 2–5, 1994).*

Carlach et al. (Soft–decoding of convolutional block codes for an interactive television return channel; IEEE; on pp. 249–253 vol. 1; Oct. 1997).*

Woerz et al. (Iterative decoding for multilevel codes using reliabilty information; IEEE; on pp. 1779–1784 vol. 3; Dec. 6–9, 1992).*

Pietrobon (A turbo/MAP decoder for use in satellite circuits; IEEE; on pp. 427–431 vol. 1 ; Sep. 9–12, 1997).*

Wang, T. et al., *"To Bit or Not to Bite —A Study of Tail Bits versus Tail–Biting"*, IEEE International Symposium on Personal, Indoor and Mobile Radio Communications, Oct. 15, 1996.

* cited by examiner

*Primary Examiner*—Albert Decady
*Assistant Examiner*—Guy Lamarre

(57) ABSTRACT

In wireless telecommunications systems, such as wireless local area networks, a flexible, less complex, and bandwidth efficient forward error correction method can be achieved by applying a first convolutional coding scheme to the bits in a first portion of a data block and a second convolutional coding scheme to the bits in a second portion of the data block, wherein the second portion of the data block may encompass a remaining portion of the data block, excluding the first portion, or the entire data block, including the first portion. While the first coding scheme employs a first code rate, the second coding scheme employs a second code rate that is higher than the first code rate. The higher rate makes it possible to incorporate the one or more tail bits into the second portion of the data block, and therefore, avoid generating any additional symbols, such as orthogonal frequency division multiplexing symbols, to exclusively modulate the tail bits.

36 Claims, 9 Drawing Sheets

EFFICIENT SYSTEM AND METHOD FOR FORWARD ERROR CORRECTION

CROSS-REFERENCES

The present application is related to Provisional Patent Application Serial No. 60/111,153, filed on Dec. 7, 1998, and Provisional Patent Application Serial No. 60/120,867, filed on Feb. 19, 1999.

FIELD OF THE INVENTION

The present invention is related to telecommunications systems, such as wireless local area networks. More particularly, the present invention relates to the protection of information bits, being transmitted within a telecommunications system.

BACKGROUND

In response to a growing need for low-cost, short-range, high capacity radio links, the European Telecommunications Standards Institute (ETSI) has established a standardization project for Broadband Radio Access Networks (BRAN). One of the broadband radio access networks being developed under ETSI BRAN is HIPERLAN Type 2 (HIPERLAN/2). HIPERLAN/2 is a short-range, high data-rate system that offers high speed access (i.e., up to 54 Mbit/sec) to a variety of networks including Universal Mobile Telecommunications System (UMTS) core networks, Asynchronous Transfer Mode (ATM) networks and Internet Protocol (IP) based networks.

An important feature of HIPERLAN/2 will be the centralized medium access control (MAC) protocol, which is intended to provide an efficient use of the available spectrum. In accordance with the MAC protocol, an access point (AP), also referred to as a base station, controls channel access by assigning downlink and uplink timeslots to the various mobile terminals (MTs) with which it is communicating, wherein a MT receives data from the access point during a downlink timeslot and transmits data to the access point during an uplink timeslot.

A characteristic of HIPERLAN/2 is that the data is transported by protocol data units (PDUs). There are different PDU types. For instance, for transporting control information, there are control PDUs, and for transporting actual data, there are data PDUs, wherein each PDU of a certain type has a fixed size.

The HIPERLAN/2 standard specifies three system layers, namely, the physical layer, the data link control (DLC) layer comprising logical link control (LLC) and MAC, and the convergence layer (CL). The CL is the interface between higher layers and the DLC layer. For example, there may be a CL for TCP/IP, which segments the IP packets into data PDUs. The DLC layer adds header information before the PDUs are passed to the physical layer. While the following discussion focuses on data PDUs, it will be understood that the same applies to control PDUs.

The physical layer of HIPERLAN/2 will be based on orthogonal frequency division multiplexing (OFDM) and convolutional encoding. The granularity of data units on the physical layer is therefore an OFDM symbol. Depending on the subcarrier modulation scheme, e.g. BPSK, QPSK, 8PSK, 16QAM or 64QAM, the number of OFDM symbols needed to carry one PDU will be different.

Another feature of HIPERLAN/2 is that several physical layer modes will be provided. For example, the system may provide physical layer modes based on the aforementioned modulation schemes and convolutional codes for rates of ½, $9/16$ and ¾. An important requirement for the DLC design is that the physical layer modes shall be designed such that each PDU fits into an integer number of OFDM symbols. Otherwise, capacity is wasted by using e.g. bit padding.

As an example, where 48 subcarriers are used for data and each PDU comprises 54 bytes, a BPSK modulation scheme with a code rate ½ is used. In this case, there are 48 bits carried by each symbol. Using a code rate of ½ for the 432 input bits (i.e., 54 bytes*8 bits/byte=432 bits) results in 864 encoder output bits without tail bits. These 864 encoder output bits are carried by exactly 18 OFDM symbols (i.e., 864 bits/(48 bits/symbol)=18 symbols). Because there is an integer number of OFDM symbols, no padding bits are needed. This is true for all other modes in HIPERLAN/2, so long as the tail bits are discarded.

It should be highlighted that the code rates ½, $9/16$ and ¾, which are being discussed for HIPERLAN/2 are only precise when the tail bits are disregarded. This issue will be discussed further below.

Another WLAN system currently being standardized is the IEEE802.11 system. The IEEE802.11 system is being designed with a 5 GHz mode, which will have similar physical layer parameters with respect to HIPERLAN/2. However, the IEEE802.11 system is specifically being designed for transmitting IP packets by radio, where the protocol principles are similar to Ethernet; hence, the MAC protocol will be very different from HIPERLAN/2. In an IEEE802.11 system, for instance, IP packets, or segments thereof, having variable lengths are transmitted. The code rates which are currently being considered for IEEE802.11 are ½, ⅔ and ¾.

An example of a flexible MAC frame 100 of HIPERLAN/2 is depicted in FIG. 1. As shown, the MAC frame 100 includes a broadcast control channel (BCCH), which contains information that is transmitted over the whole area (e.g., cell) covered by one AP. The assignment of logical channels to different MTs is transmitted in the frame control channel (FCCH), sometimes referred to as the resource grant channel. Accordingly, each MT knows the exact, dedicated time period in the MAC frame 100 when it is expected to receive a downlink burst and/or send an uplink burst. A random access channels (RACH) is located at the end of the MAC frame 100. A MT may request capacity by transmitting the request in its assigned uplink burst channel or via the random access channel.

The described MAC frame 100 illustrated in FIG. 1 should be understood as one possible arrangement of fields. In fact, the fields may appear in a different order. Furthermore, some of the fields in the MAC frame 100 may not appear at all, while others may be added. Regardless, the present invention described below is still applicable.

In each MAC frame field, data is transmitted from the AP to one or more MTs, or vice versa. A block of data which is destined for, or sent by, one MT is called a "burst". Each burst comprises one or more PDUs. On the DLC layer, the concatenation of several PDUs may also be called a PDU train, or 'cell' train when the transmission of ATM cells is involved. On the physical layer, a preamble may be added at the beginning of each burst for synchronization and channel estimation purposes. If the channel access scheme is dynamic TDMA, the length of a burst is variable.

A convolutional code (CC) can be used to encode blocks of data. When CCs are used, tail bits (e.g. zero bits) are appended to the stream of information bits. The tail bits ensure that the encoding process terminates in a pre-defined state, e.g. in the zero state, thus providing protection for the last bits in a block. For a CC with constraint length 7, 6 tail bits are needed for termination. This results in additional redundancy. However, the code rate of a CC is often given without taking into account the tail bits. For example, the code rates ½, ⁹⁄₁₆ and ¾, which are being discussed for HIPERLAN/2, do not include the tail bits. Therefore, the actual code rate is slightly lower due to the redundancy being increased as caused by the use of additional tail bits.

In a TDMA system with fixed timeslots, e.g., GSM, the timeslots have a fixed duration, and while the number of information bits may vary, the number of modulating bits remains fixed. This is often provided by a variety of puncturing schemes, one per physical layer mode. The tail bits are included in the design of the puncturing scheme which is specific.

IEEE802.11 is an ad-hoc network without regular frame structure. IP packets or segments thereof, which have variable length or more precisely a length being typically determined by the IP layer above the IEEE802.11 protocol, are transmitted. The encoding is performed based on a selected coding scheme with a code rate for the whole packet. At the end of the packet, the tail bits are appended and encoded like the data. The encoded data, including the tail bits, is mapped to OFDM symbols. The last OFDM symbol may not be filled totally, hence bit padding is applied.

HIPERLAN/2, and like systems, are characterized by the following features: the PDUs comprise a fixed number of information bits prior to channel encoding, disregarding tail bits. Moreover, there are multiple physical layer modes such that the PDUs map to an integer number of OFDM symbols, or some other physical layer units. Finally, the number of puncturing schemes is reasonably limited, for example, to three simple puncturing schemes corresponding to the rates ½, ⁹⁄₁₆ and ¾, and the encoding is conducted either on a PDU-wise or a burst-wise basis.

Given the aforementioned features, accommodating the additional tail bits in the encoded sample stream without wasting an additional OFDM symbol, or without using an inconvenient (for implementation) high number of complicated puncturing schemes for all possible combinations of physical layer modes and burst lengths, in the case of burst-wise encoding, is problematic. The problem is illustrated by way of example in FIG. 2 for the case of PDU-wise encoding. As shown, each PDU may be mapped onto 4 OFDM symbols for the physical layer mode I with code rate ¾, and onto 6 OFDM symbols for the physical layer mode II with code rate ½, respectively, where the physical layer mode I and the physical layer mode II are examples, and may not necessarily correspond with any HIPERLAN/2 mode. Since the code rates for all available physical layer modes are restricted to relatively "simple" code rates, such as ½, ⁹⁄₁₆, ¾, the only possibility is to transmit the tail bits using an additional OFDM symbol as illustrated. In the case of relatively small PDU sizes, as in HIPERLAN/2, a large amount of redundancy for defining the final state of the encoder will result. Alternatively, in GSM, one specific puncturing scheme is used for each mode. This approach is not attractive for implementation reasons, particularly because the PDUs comprise a rather high number of bits.

The problem is essentially the same with respect to burst-wise encoding. This is further illustrated by way of the example in FIG. 3, where a code rate of ¾ is assumed. In the example illustrated in FIG. 3, a burst is either 2 or 3 PDUs in length. Thus, the PDUs contained in one burst are mapped onto an integer number of OFDM symbols and the additional tail bits would require an additional OFDM symbol for transmission. Regarding the use of many specific puncturing schemes, the number of required puncturing schemes would be equal to the number of physical layer modes times the possible number of PDUs per burst, which may be in the order of 512 schemes (i.e., 8 modes*64 PDUs/Burst), or higher.

To overcome the problem of employing additional OFDM symbols to transport the tail bits, a solution with the following features is needed. Tail bits are transmitted within the usual structure of bursts, consisting of fixed-length PDUs, without using additional OFDM symbols, or other physical layer units. The use of many irregular or complicated puncturing patterns over the whole PDU or burst is avoided. The number of puncturing schemes for the different physical-layer modes as well as for PDU-wise or burst-wise encoding is only slightly increased, when compared to the case without the additional tail bits.

SUMMARY OF THE INVENTION

The present invention involves a forward error correction technique for use in wireless telecommunications systems, where a first convolutional coding scheme is applied to the bits in a first portion of a data block and a second convolutional coding scheme is applied to the bits in a second portion of the data block, and where the second portion of the data block may encompass a part of the data block or the entire data block, including the first portion. The first and the second coding scheme may be implemented using the same convolutional coding scheme with a first and a second puncturing scheme respectively. While the first coding scheme employs a first code rate, the second coding scheme employs a second code rate that is higher than the first code rate. The higher rate makes it possible to incorporate the one or more tail bits into the second portion of the data block. In so doing, generation of additional symbols, such as orthogonal frequency division multiplexing symbols, can be avoided.

In accordance with a first exemplary embodiment of the present invention, the various advantages associated with the present invention are achieved with a method for protecting a block of information bits. The method involves appending a number of tail bits to the block of information bits and encoding the block of information bits, along with the appended tail bits, at a given code rate. A first puncturing scheme is then applied to a first portion of the encoded block of information bits and a second puncturing scheme is applied to a remaining portion of said encoded block of information bits.

In accordance with a second exemplary embodiment of the present invention, the various advantages associated with the present invention are achieved with a method for protecting a block of information bits. The method involves appending a number of tail bits to the block of information bits and, thereafter, encoding the block of information bits, including the number of appended tail bits. A first puncturing scheme is then applied to at least one portion of said encoded block of information bits, including the appended tail bits, and a second puncturing scheme is applied to the entire block of information bits, including the portion of the block of information bits to which the first puncturing scheme was applied.

In accordance with a third exemplary embodiment of the present invention, the various advantages associated with the present invention are achieved with a method for protecting a block of information bits. This method involves appending a number of tail bits to the block of information bits and encoding the block of information bits, including the number of appended tail bits. Thereafter, a "nominal" puncturing scheme is applied to the entire, encoded block of information bits, which includes said number of appended tail bits, and an "additional" puncturing scheme is applied to at least one portion of said encoded block of information bits.

BRIEF DESCRIPTION OF THE FIGURES

The present invention will be described in detail herein below with reference to the figures wherein.

DETAILED DESCRIPTION OF THE INVENTION

The inventive method described herein below is intended for systems like HIPERLAN/2 which employs a flexible MAC frame structure and fixed length PDUs. However, the present invention is not intended to be restricted to HIPERLAN/2. Other systems for which the present invention is applicable are, for example, wireless ATM systems, in general, and the Universal Mobile Telecommunications System (UMTS).

In accordance with exemplary embodiments of the present invention, a block of information bits, such as a PDU or a plurality of PDUs herein referred to as a burst, is encoded, in whole or in part, using one of several "nominal" code rates, for example, ½, 9/16 or ¾. Tail bits, which have been appended to the block of information bits, are encoded together with the information bits. The tail bits guarantee trellis termination and that the last bits in the information block are protected with the same quality as all other bits. However, in order to avoid the necessity of an additional OFDM symbol, and in order to accommodate encoded tail bits in previous symbols, one or more previous symbols are punctured using a different puncturing scheme as compared to the remaining portion of the encoded block of information bits. More particularly, the code rate associated with the portion of the encoded block that has been punctured differently is increased due to the additional puncturing. Consequently, the total number of encoded bits is reduced, such that the number of encoded bits fits into a smaller, integer number of OFDM symbols than would otherwise be required.

It should be noted that the portion of the encoded block which is punctured using a different puncturing scheme than the remaining portion(s) of the block, may be located at the beginning, at the end, or even in the middle of the block. Alternatively, this portion of the encoded block may be divided into multiple, non-contiguous portions arbitrarily located throughout the encoded block. With regard to implementation complexity, the preferred position is at the beginning of a block, while the number of encoded bits within this portion of the block is preferably equal for all modes. In this preferred embodiment it is possible that this additional puncturing scheme uses one single pattern for all modes.

It is also important to note that the number of OFDM symbols associated with that portion of the encoded block that has been punctured differently is small. One advantage to this invention is the possibility that the number of affected OFDM symbols is, at most, the smallest number of OFDM symbols per PDU in all existing physical layer modes, and among all PDU types. In this particular instance, only one additional puncturing scheme, applicable to all physical modes and PDU types, is needed. It should be further noted that the physical layer mode(s) entitled I (and II) are only simplified examples, which may not correspond to any HIPERLAN/2 mode.

Figure 1:
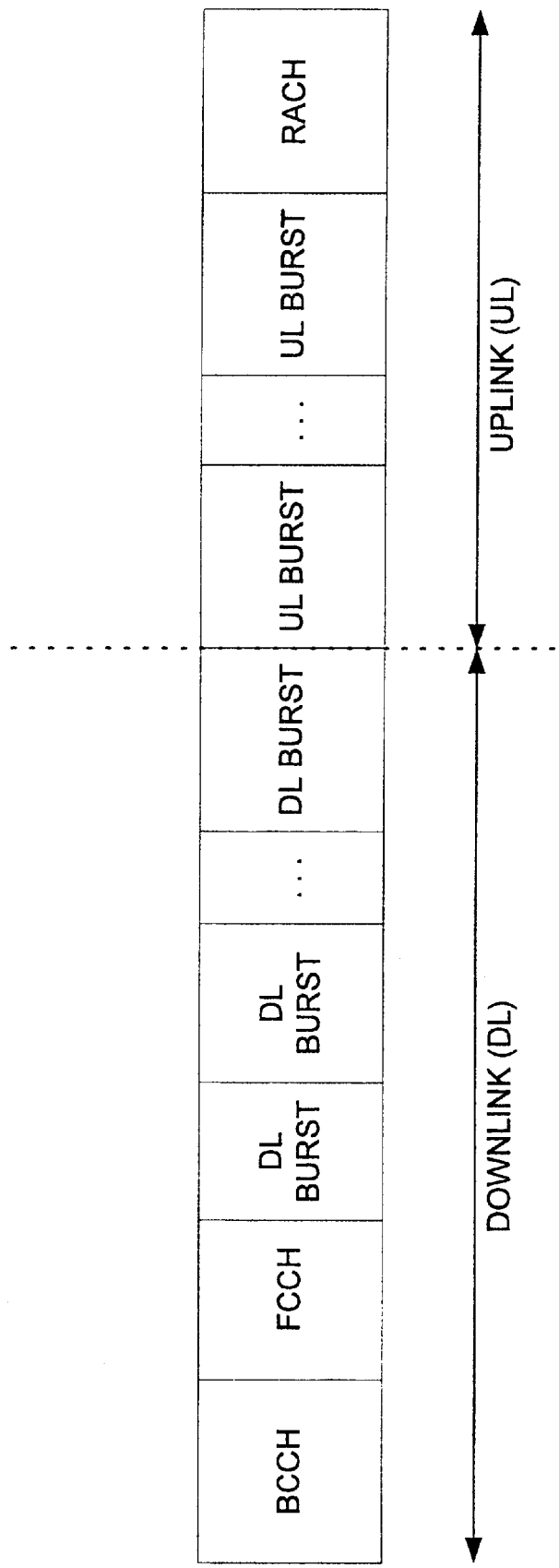
FIG. 1 illustrates an exemplary Medium Access Control protocol frame in a dynamic Time Division Multiple Access/Time Division Duplex (TDMA/TDD) system.
Figure 2:
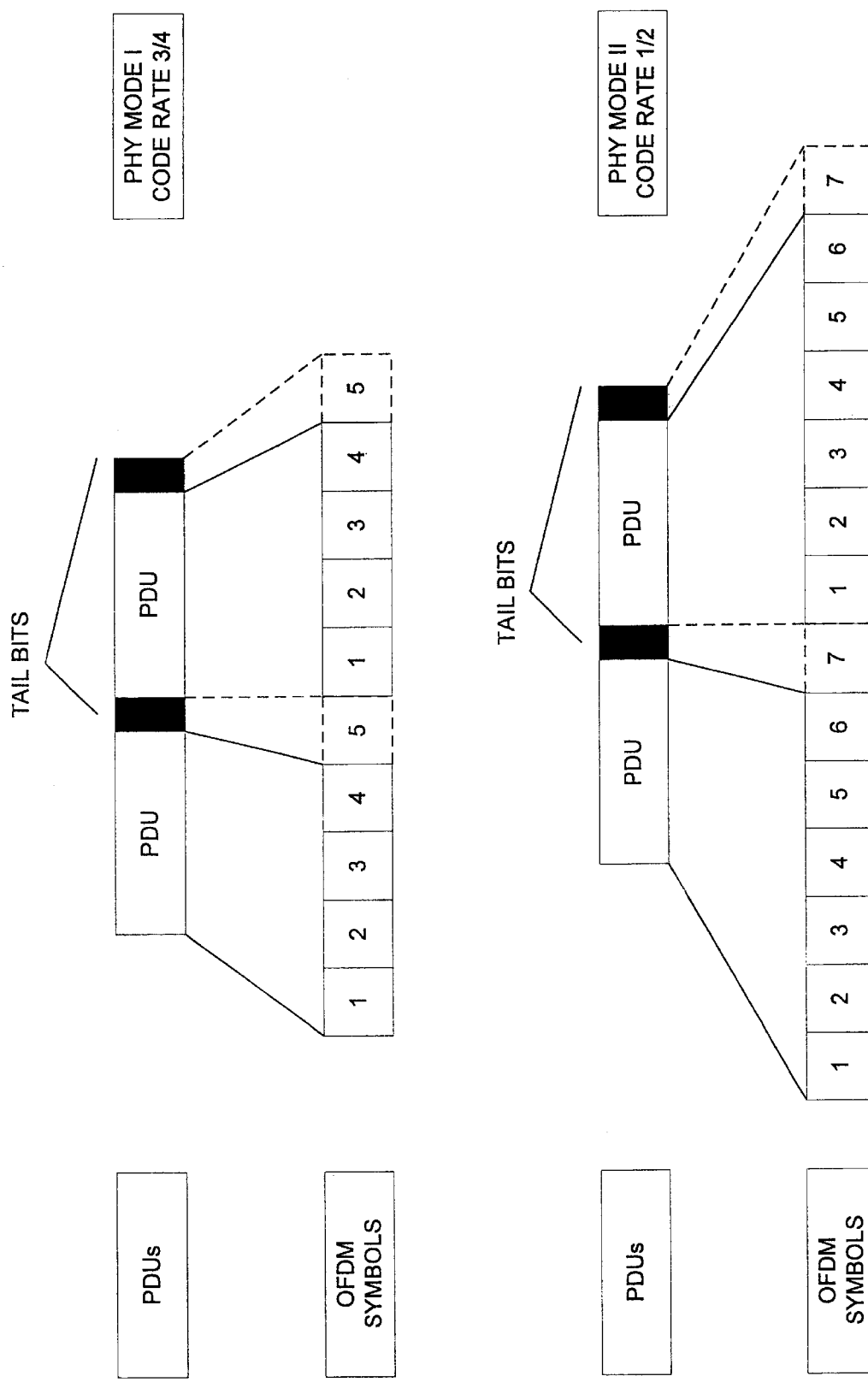
FIG. 2 illustrates PDU-wise encoding in accordance with conventional techniques.
Figure 3:
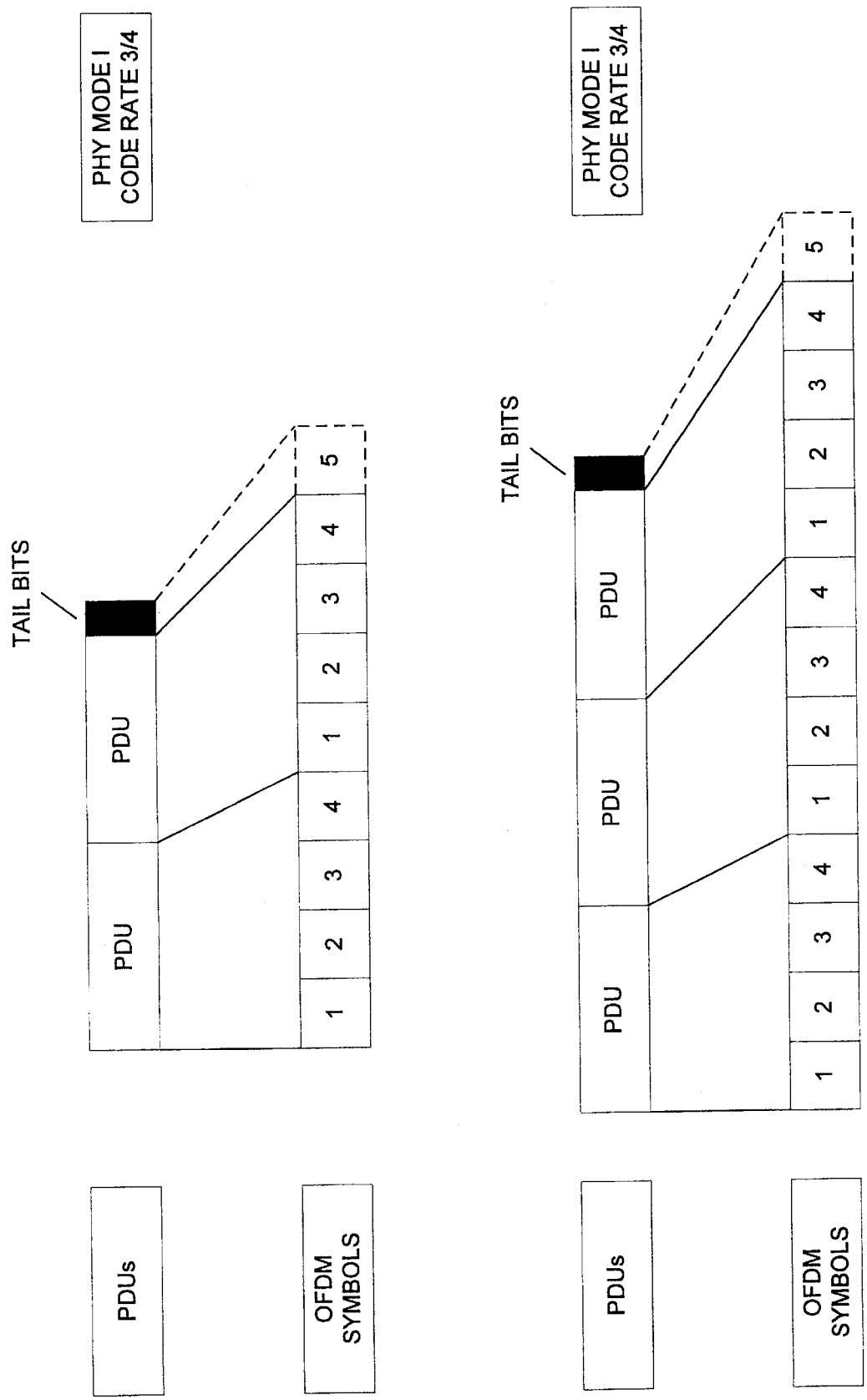
FIG. 3 illustrates burst-wise encoding in accordance with conventional techniques.
Figure 4:
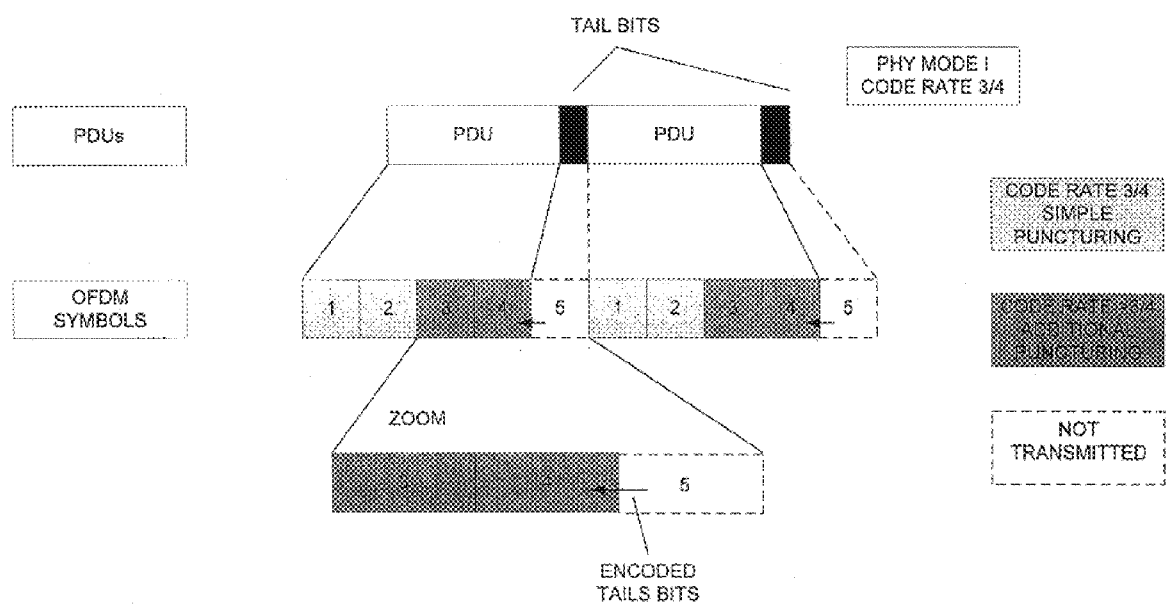
FIG. 4 illustrates PDU-wise encoding in accordance with an exemplary embodiment of the present invention.

A first exemplary embodiment relating to the case of PDU-wise encoding (i.e., where each block of information bits corresponds to a single PDU) is illustrated by way of example in FIG. 4. As illustrated, the encoded tail bits would ordinarily be transported by an additional OFDM symbol 5 at the end of each PDU, if the code rate of ¾ is used for all OFDM symbols 1–5. However, in accordance with this first exemplary embodiment, the encoded tail bits are removed from what would otherwise be OFDM symbol 5 and accommodated into the previous two symbols 3–4. This is achieved by employing a different puncturing pattern for the coded bits associated with the two previous OFDM symbols 3–4, thereby resulting in a higher code rate for these symbols. OFDM symbol 5 is, therefore, no longer required.

Figure 5:
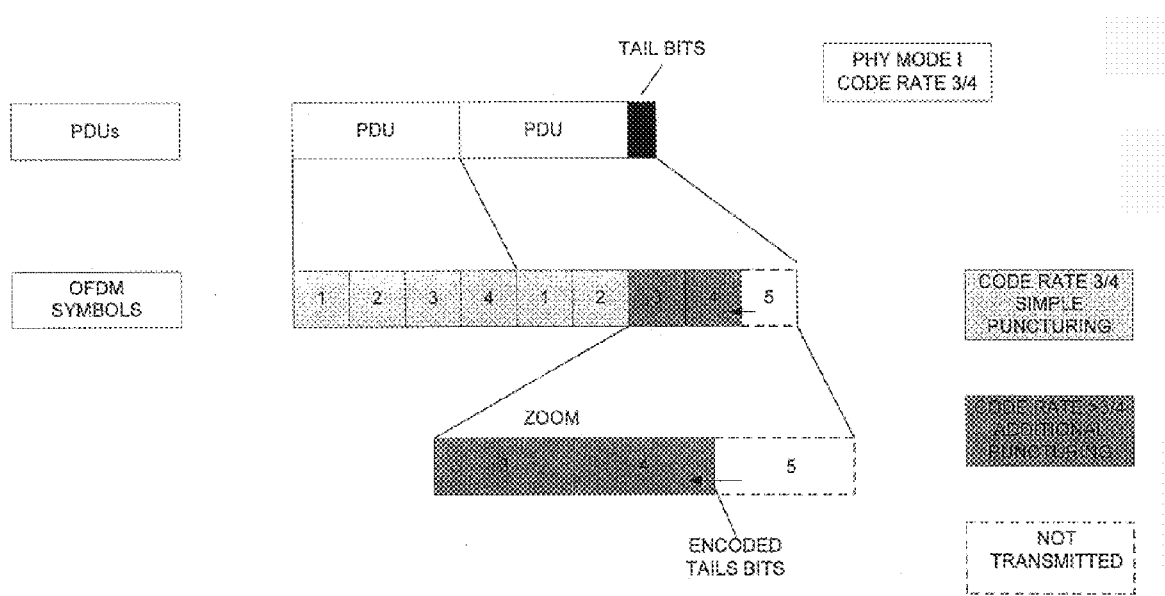
FIG. 5 illustrates burst-wise encoding in accordance with an exemplary embodiment of the present invention.

A second exemplary embodiment relating to the case of burst-wise encoding (i.e., where each block of information bits corresponds to a plurality of PDUs) is illustrated by way of example in FIG. 5. Here, only the coded bits associated with the two last OFDM symbols 3–4 in the burst are punctured differently to accommodate the encoded tail bits. In contrast, the last two OFDM symbols 3–4 in each PDU were punctured differently in the PDU wise encoding scheme of the first exemplary embodiment.

Figure 6:
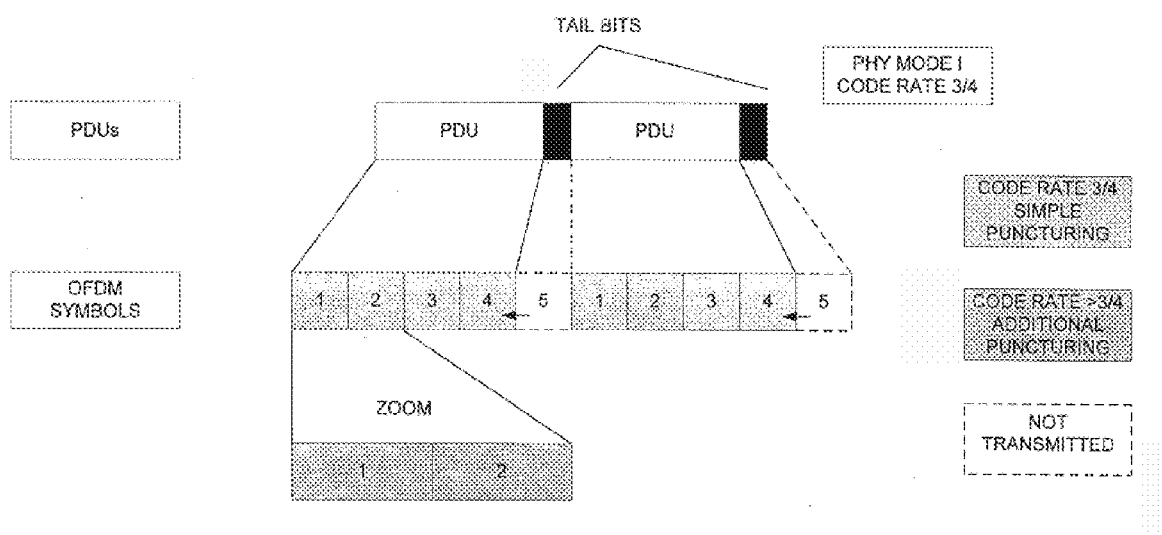
FIG. 6 illustrates PDU-wise encoding in accordance with an exemplary embodiment of the present invention, wherein an "additional puncturing" scheme is applied at the beginning of a block of encoded bits.
Figure 7:
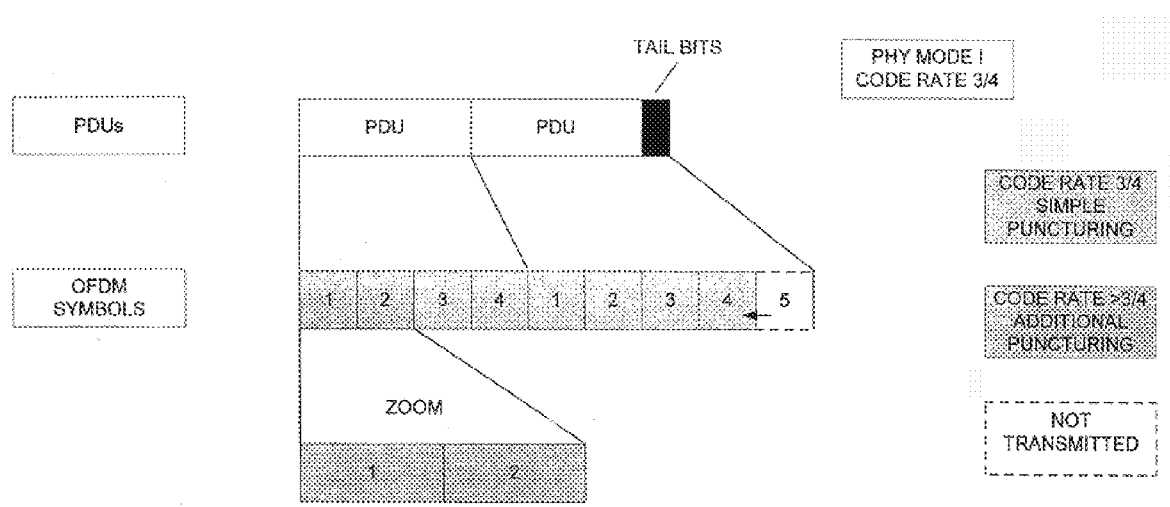
FIG. 7 illustrates burst-wise encoding in accordance with an exemplary embodiment of the present invention, wherein an "additional puncturing" scheme is applied at the beginning of a block of encoded bits.

In the two exemplary embodiments of the present invention described herein above, "additional" puncturing is applied to OFDM symbols located at the end of each PDU or at the end of each burst. In accordance with alternative embodiments, the "additional" puncturing may be applied to, one or more OFDM symbols located at the beginning of each PDU or each burst. These alternative embodiments are illustrated in FIGS. 6 and 7 for PDU-wise encoding/terminating and burst-wise encoding/terminating, respectively. It is further illustrated in FIGS. 6 and 7 that a "nominal" or "simple" puncturing scheme is applied to the remaining OFDM symbols in the block, where the "additional" puncturing scheme may employ a puncturing pattern that is different from the puncturing pattern associated with the "nominal" or "simple" puncturing scheme.

In accordance with still flurther alternative embodiments, the block of encoded bits may be divided into more than two portions, wherein the "nominal" and/or the "additional" puncturing schemes are applied to OFDM symbols associated with two or more non-contiguous portions. It will be further understood that the puncturing patterns associated with the "additional" puncturing scheme and the "nominal" puncturing scheme may be different from each other.

In accordance with a preferred embodiment of the present invention, a two-stage puncturing scheme is applied, wherein a first puncturing scheme, for example, an "additional" puncturing scheme, is applied to a first portion of the encoded block of information bits, while a second puncturing scheme, for example, a "nominal" puncturing scheme, is subsequently applied to the entire block of information bits, including the first portion of the encoded block. It will be understood that this preferred embodiment may be implemented in reverse order, wherein a first puncturing scheme is applied to the entire block of information bits during a first stage, and a second puncturing scheme is applied to a portion of the entire block during a second stage.

Figure 8:
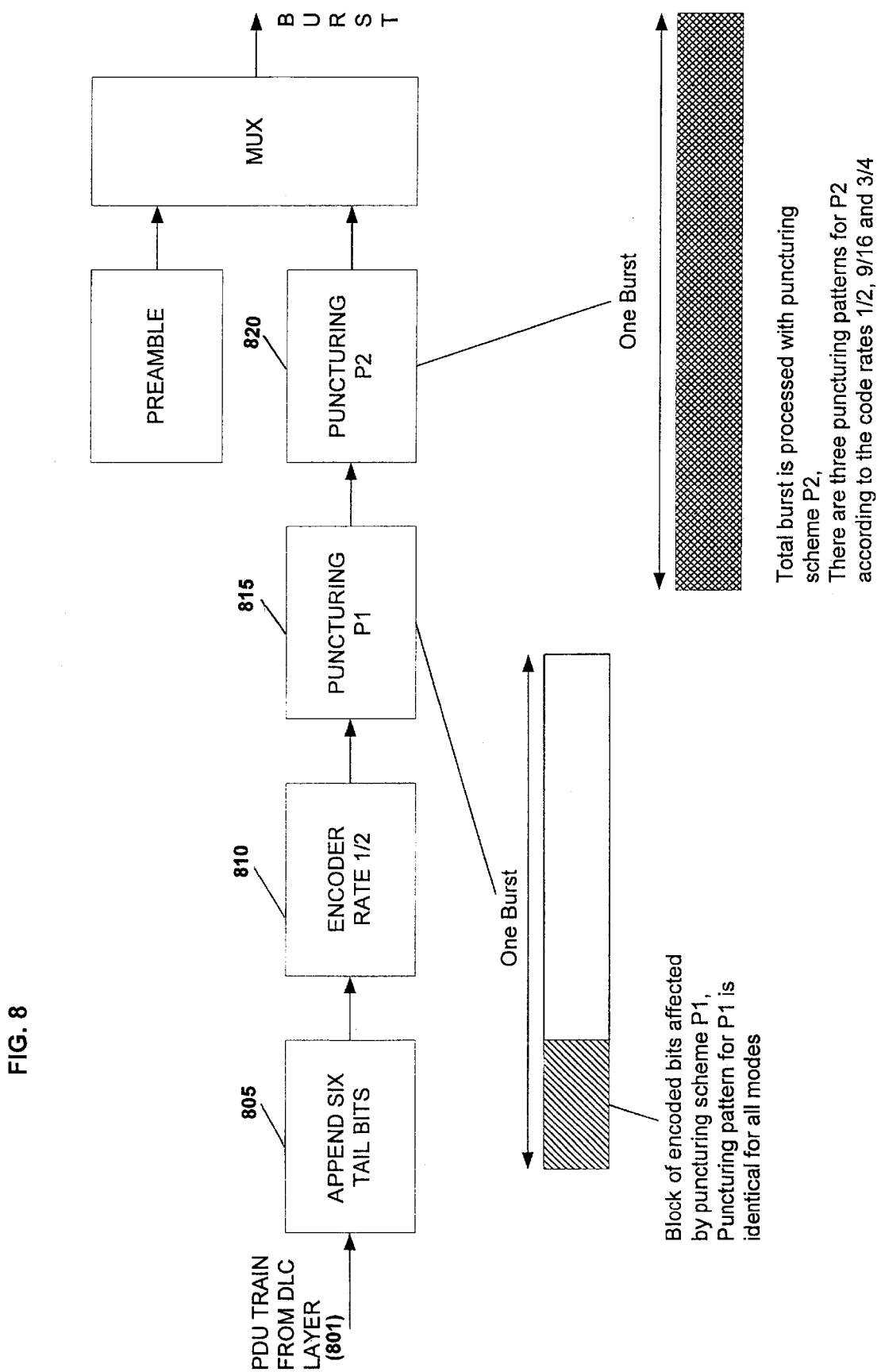
FIG. 8 illustrates a two-stage puncturing scheme, in accordance with an exemplary embodiment of the present invention, wherein a first puncturing scheme is applied to a part at the beginning of the block and a second puncturing scheme is applied to the whole block.

FIG. 8 depicts a block diagram illustrating the above-identified, preferred embodiment of the present invention, where initially a block of data bits is delivered from the DLC layer in accordance with step 801. This block of bits may be a number of PDUs to be transmitted in a single burst or it may be one PDU which is encoded separately from other PDUs. To this block of data bits, six tail bits (e.g., all zeros) are appended, as indicated by step 805, since in this particular example a convolutional encoder having constraint length 7 is assumed. The entire block of information bits, including the tail bits, is encoded using a convolutional encoder with code rate ½, in accordance with step 810. It should be noted that burst-wise encoding has the advantage of introducing less redundancy than PDU-wise encoding, which may be particularly important when the PDUs tend to be relatively short. Accordingly, in the following discussion, burst-wise encoding is assumed.

Figure 9:
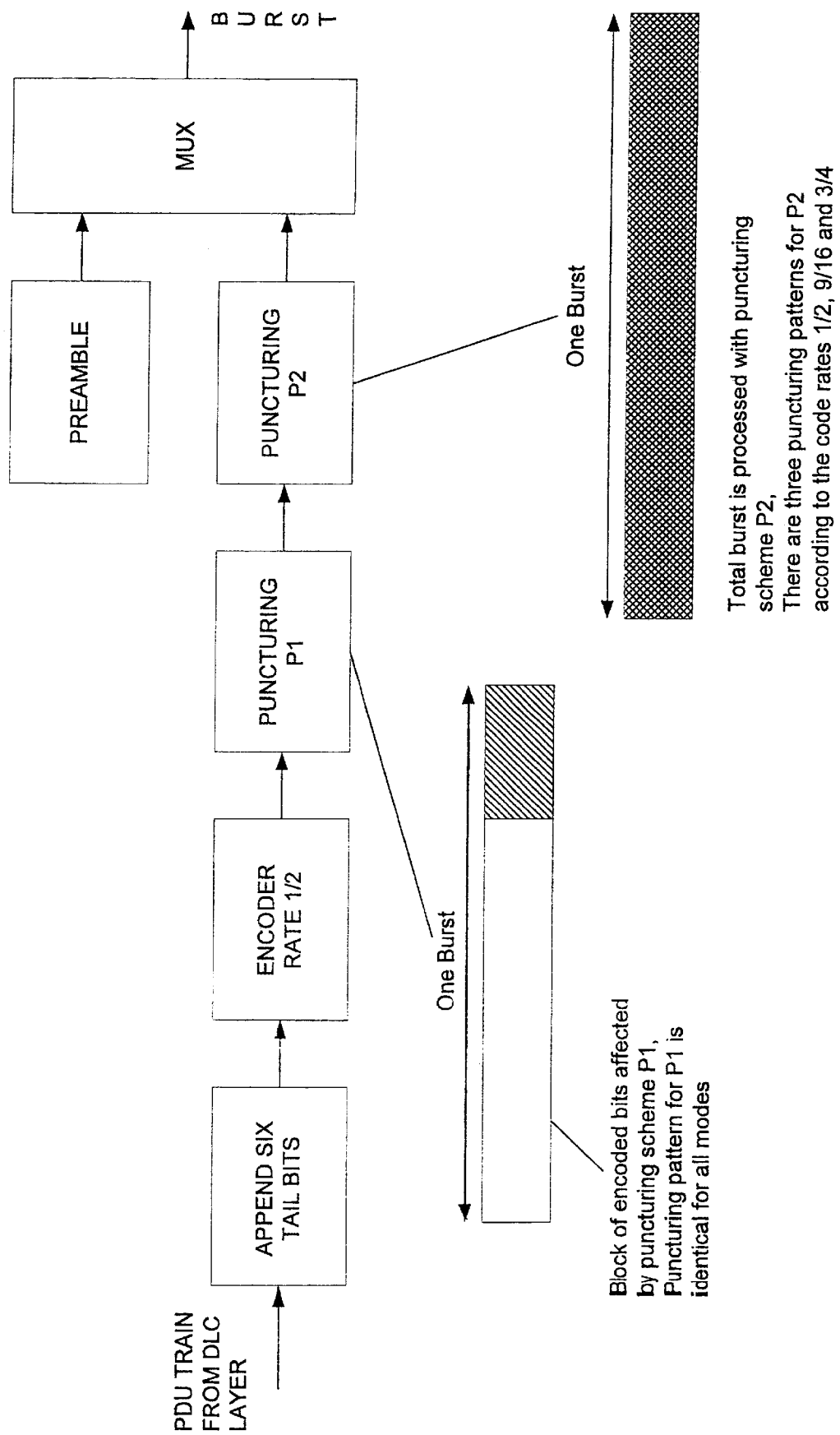
FIG. 9 illustrates a two-stage puncturing scheme, in accordance with an exemplary embodiment of the present invention, wherein a first puncturing scheme is applied to a part at the end of the block, and a second puncturing scheme is applied to the whole block.

If the specified puncturing schemes for the code rates ½, 9/16 and ¾ are applied directly after the encoder, the total number of encoded bits would not fit within an integer number of OFDM symbols. Due to the inserted 6 tail bits, there would always be 12 encoded bits at the end of each burst, which would require an additional OFDM symbol, as explained previously. This, of course, is the problem that the present invention overcomes. Accordingly, a first puncturing scheme P1 (i.e., the "additional" puncturing scheme) is applied to a portion of each burst, comprising a certain number of coded bits, where the portion is located at the beginning of each burst, as shown by step 815. The portion of coded bits is located at the beginning rather than the end of the burst solely for the purpose of illustration. Obviously, the location of the portion of coded bits affected by the first puncturing scheme P1 may be at the end of the burst, as shown in FIG. 9, in the middle of the burst, or scattered across the burst in non-contiguous portions.

The number of coded bits to which the first (i.e., "additional") puncturing is applied should be reasonably low in order to have but a moderate increase of complexity, and to enable the use of the same "additional" puncturing pattern for all modes, even though one PDU may comprise a different number of coded bits for different modes and/or different PDU types.

As an implementation example, the length of the block of coded bits affected by the "additional" puncturing may be equal to 96 coded bits (i.e., 6 bytes/PDU*8 bits/byte*2 coded bits/input bit) because this may be equal to the smallest number of coded bits among all PDU types. The respective puncturing pattern for P1 may be (11111110), repeated 12 times, wherein each of the first 12 blocks of a burst, consisting of 8 coded bits, every eighth bit is discarded and, thus, not transmitted.

The inventive method includes two general types of embodiments: two-part and two-stage puncturing. The two-part puncturing partitions the block of coded bits into two parts. One part which may be the beginning, the middle or the end of the whole block, which is subject to the "additional" puncturing scheme. The other remaining part is punctured by the "nominal" scheme. In the case of the two-stage puncturing, being the preferred embodiment, puncturing is divided into two stages. In the first stage the "additional" puncturing is applied to only a part of the block of coded bits, which may be either at the beginning or at the end or somewhere else in the block. It will also be easily understood that it is possible to split the block where the "additional" puncturing scheme is applied into multiple portions being located at arbitrary positions in the total block. In the second stage, "nominal" puncturing is used for the whole block. However, the order of processing may be reversed, wherein the first stage being the "nominal" puncturing for the total block and the second stage being the "additional" puncturing for a small part, or for small portions, of the block.

It should be emphasised that the part affected by the "additional" puncturing pattern is rather short compared to the whole PDU or the whole burst. Furthermore, if the number of symbols where the "additional" puncturing scheme is applied is smaller than or at least equal to the smallest number of symbols per PDU, the same two-part puncturing approach may be used for all physical layer modes and also all PDU types; therefore the number of puncturing patterns does not exceed the provided number of "nominal" code rates, e.g., ½, 9/16, ¾, plus one (or a few) additional puncturing patterns needed for the "additionally" punctured part of coded bits.

It appears even more attractive with regard to implementation complexity to define the length of the part affected by the "additional" puncturing in terms of number of coded bits. In this case, the length, in terms of coded bits, of the mentioned part is independent from the specific physical layer mode and/or PDU type, respectively. Hence, only one "additional" puncturing pattern needs to be used.

The present invention is more attractive than conventional schemes because conventional schemes involve complicated puncturing schemes due to the fact that tail bits are distributed over the entire information block (e.g., PDU or burst). Conventional schemes also involve appending tail bits and bit padding for the last OFDM symbol which results in a waste of bandwidth. Compared to conventional schemes, the present invention provides increased flexibility, reduced implementation complexity, and increased bandwidth efficiency by avoiding bit padding.

The present invention has been described with reference to several exemplary embodiments. However, if will be readily apparent to those skilled in the art that it is possible to embody the invention in specific forms other than as described above without departing from the spirit of the invention. The embodiments described above are illustrative, and should not be considered restrictive in any way. The scope of the invention is given by the appended claims, rather than the preceding description, and all variations and equivalents which fall within the range of the claims are intended to be embraced therein.

What is claimed is:

1. In a telecommunications system, a method for protecting a block of information bits, said method comprising the steps of:

appending a number of tail bits to said block of information bits;

encoding the block of information bits, along with the appended tail bits, at a given code rate;

applying a first puncturing scheme to a first portion of said encoded block of information bits; and applying a second puncturing scheme to a remaining portion of said encoded block of information bits, said second puncturing scheme puncturing a number of bits equal to said number of encoded tail bits.

2. The method of claim 1, where said step of encoding the block of information bits, along with the appended tail bits, at a given code rate comprises the step of:

encoding the block of information bits, along with the appended tail bits using a convolutional encoder.

3. The method of claim 2, wherein said given code rate is equal to ½.

4. The method of claim 1, wherein said telecommunications system employs a medium access control protocol, and wherein said block of information bits includes at least one protocol data unit.

5. In a telecommunications system, a method for protecting a block of information bits, said method comprising the steps of:

appending a number of tail bits to said block of information bits;

encoding said block of information bits, including said number of appended tail bits;

applying a first puncturing scheme to at least one portion of said encoded block of information bits, including said appended tail bits; and applying a second puncturing scheme to the entire block of information bits, including the portion of said block of information bits to which said first puncturing scheme was applied, wherein said first puncturing scheme punctures a number of bits equal to said number of encoded tail bits.

6. The method of claim 5, wherein said step of encoding said block of information bits, including said number of appended tail bits comprises the step of:

encoding said block of information bits, including said number of appended tail bits, using a convolutional encoder.

7. The method of claim 6, wherein said step of encoding said block of information bits, including said number of appended tail bits further comprises the step of:

encoding said block of information bits, including said number of appended tail bits, at a code rate of ½.

8. The method of claim 5, wherein said step of applying the first puncturing scheme to at least one portion of said encoded block of information bits, including said appended tail bits comprises the step of:

applying the first puncturing scheme to a beginning portion of said encoded block of information bits, including said appended tail bits.

9. The method of claim 5, wherein said step of applying the first puncturing scheme to at least one portion of said encoded block of information bits, including said appended tail bits comprises the step of:

applying the first puncturing scheme to a last portion of said encoded block of information bits, including said appended tail bits.

10. The method of claim 5, wherein said step of applying a first puncturing scheme to at least one portion of said encoded block of information bits, including said appended tail bits, comprises the step of:

applying an "additional" puncturing scheme to the at least one portion of said encoded block of information bits, including said appended tail bits.

11. The method of claim 5, wherein said step of applying the first puncturing scheme to at least one portion of said encoded block of information bits, including said appended tail bits comprises the step of:

applying the first puncturing scheme to a plurality of non-contiguous portions of said encoded block of information bits, including said appended tail bits.

12. The method of claim 5, wherein said step of applying a second puncturing scheme to said entire block of information bits comprises the step of:

applying a "nominal" puncturing scheme to said entire block of information bits, including the portion of said block of information bits to which said first puncturing scheme was applied.

13. The method of claim 12 wherein said step of applying a "nominal" puncturing scheme to said entire block of information bits, including the portion of said block of information bits to which said first puncturing scheme was applied, comprises the step of:

applying a puncturing pattern according to a code rate of ½.

14. The method of claim 12, wherein said step of applying a "nominal" puncturing scheme to said entire block of information bits, including the portion of said block of information bits to which said first puncturing scheme was applied, comprises the step of:

applying a puncturing pattern according to a code rate of 9/16.

15. The method of claim 12, wherein said step of applying a "nominal" puncturing scheme to said entire block of information bits, including the portion of said block of information bits to which said first puncturing scheme was applied, comprises the step of:

applying a puncturing pattern according to a code rate of ¾.

16. The method of claim 5, wherein said portion of said encoded block of information bits, including said appended tail bits, contains substantially fewer bits than a number of bits contained in a remaining portion of said encoded block of information bits.

17. The method of claim 5, wherein said telecommunications system employs a medium access control protocol, and wherein said block of information bits includes at least one protocol data unit.

18. In a telecommunications system, a method for protecting a block of information bits, said method comprising the steps of:

appending a number of tail bits to said block of information bits;

encoding said block of information bits, including said number of appended tail bits;

applying a "nominal" puncturing scheme to the entire encoded block of information bits, which includes said number of appended tail bits; and applying an "additional" puncturing scheme to at least one portion of said encoded block of information bits to which said "nominal" puncturing scheme was applied, wherein said "additional" puncturing scheme punctures a number of bits equal to said number of encoded tail bits.

19. The method of claim 18, wherein said step of encoding said block of information bits, including said number of appended tail bits comprises the step of:

encoding said block of information bits, including said number of appended tail bits, using a convolutional encoder.

20. The method of claim 19, wherein said step of encoding said block of information bits, including said number of appended tail bits further comprises the step of:

encoding said block of information bits, including said number of appended tail bits, at a code rate of ½.

21. The method of claim 18 wherein said step of applying the "additional" puncturing scheme comprises the step of:

applying the "additional" puncturing scheme to a beginning portion of said encoded block of information bits.

22. In a telecommunications system, an apparatus for protecting a block of information bits, said apparatus comprising:

means for appending a number of tail bits to the block of information bits;

means for encoding the block of information bits, along with the appended tail bits, at a given code rate;

means for applying a first puncturing scheme to a first portion of the encoded block of information bits; and means for applying a second puncturing scheme to a remaining portion of the encoded block of information bits, said second puncturing scheme puncturing a number of bits equal to said number of encoded tail bits.

23. The apparatus of claim 22, where said means for encoding the block of information bits, along with the appended tail bits, at a given code rate comprises:

means for encoding the block of information bits, along with the appended tail bits using a convolutional encoder.

24. The apparatus of claim 22, wherein the telecommunications system employs a medium access control protocol, and wherein the block of information bits includes at least one protocol data unit.

25. In a telecommunications system, an apparatus for protecting a block of information bits, said apparatus comprising:

means for appending a number of tail bits to the block of information bits;

means for encoding the block of information bits, including the number of appended tail bits;

means for applying a first puncturing scheme to at least one portion of the encoded block of information bits, including the appended tail bits; and means for applying a second puncturing scheme to the entire block of information bits, including the portion of the block of information bits to which the first puncturing scheme was applied, wherein said first puncturing scheme punctures a number of bits equal to said number of encoded tail bits.

26. The apparatus of claim 25, wherein said means for encoding the block of information bits, including the number of appended tail bits comprises:

means for encoding the block of information bits, including the number of appended tail bits, using a convolutional encoder.

27. The apparatus of claim 25, wherein said means for applying the first puncturing scheme to a least one portion of the encoded block of information bits, including the appended tail bits comprises:

means for applying the first puncturing scheme to a beginning portion of the encoded block of information bits, including the appended tail bits.

28. The apparatus of claim 25, wherein said means for applying the first puncturing scheme to a least one portion of the encoded block of information bits, including the appended tail bits comprises:

means for applying the first puncturing scheme to a last portion of the encoded block of information bits, including the appended tail bits.

29. The apparatus of claim 25, wherein said means for applying a first puncturing scheme to at least one portion of the encoded block of information bits, including the appended tail bits comprises:

means for applying an "additional" puncturing scheme to the at least one portion of the encoded block of information bits, including the appended tail bits.

30. The apparatus of claim 25, wherein said means for applying the first puncturing scheme to at least one portion of the encoded block of information bits, including the appended tail bits comprises:

means for applying the first puncturing scheme to a plurality of noncontiguous portions of the encoded block of information bits, including the appended tail bits.

31. The apparatus of claim 25, wherein said means for applying a second puncturing scheme to the entire block of information bits comprises:

means for applying a "nominal" puncturing scheme to the entire block of information bits, including the portion of the block of information bits to which the first puncturing scheme was applied.

32. The apparatus of claim 25, wherein the portion of the encoded block of information bits, including the appended tail bits, contains substantially fewer bits than a number of bits contained in a remaining portion of the encoded block of information bits.

33. The apparatus of claim 25, wherein the telecommunications system employs a medium access control protocol, and wherein the block of information bits includes at least one protocol data unit.

34. In a telecommunications system, an apparatus for protecting a block of information bits comprising:

means for appending a number of tail bits to the block of information bits;

means for applying a "nominal" puncturing scheme to the entire encoded block of information bits, which includes the number of appended tail bits; and means for applying an "additional" puncturing scheme to at least one portion of the encoded block of information bits to which the "nominal" puncturing scheme was applied, wherein said "additional" puncturing scheme punctures a number of bits equal to said number of encoded tail bits.

35. The apparatus of claim 34, wherein said means for encoding the block of information bits, including the number of appended tail bits comprises:

means for encoding the block of information bits, including the number of appended tail bits, using a convolutional encoder.

36. The apparatus of claim 34, wherein said means for applying the "additional" puncturing scheme comprises:

means for applying the "additional" puncturing scheme to a beginning portion of the encoded block of information bits.

* * * * *